(12) United States Patent
Haight

(10) Patent No.: US 7,310,728 B2
(45) Date of Patent: Dec. 18, 2007

(54) METHOD OF IMPLEMENTING A HIGH-SPEED HEADER BYPASS FUNCTION

(75) Inventor: Charles Francis Haight, Pine Brook, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 723 days.

(21) Appl. No.: 10/718,564

(22) Filed: Nov. 24, 2003

(65) Prior Publication Data

US 2005/0125657 A1    Jun. 9, 2005

(51) Int. Cl.
*H04L 9/00* (2006.01)
*G06F 15/16* (2006.01)

(52) U.S. Cl. .................................. 713/154; 726/12
(58) Field of Classification Search ................ 713/154
See application file for complete search history.

(56) References Cited

U.S. PATENT DOCUMENTS

| | | | |
|---|---|---|---|
| 5,260,881 A | 11/1993 | Agrawal et al. | |
| 5,426,379 A | 6/1995 | Trimberger | |
| 5,475,830 A | 12/1995 | Chen et al. | |
| 5,596,743 A | 1/1997 | Bhat et al. | |
| 5,710,767 A | 1/1998 | Davidian et al. | |
| 6,052,786 A * | 4/2000 | Tsuchida | 726/14 |
| 6,295,604 B1 * | 9/2001 | Callum | 713/160 |
| 6,311,316 B1 | 10/2001 | Huggins et al. | |
| 6,477,646 B1 * | 11/2002 | Krishna et al. | 713/189 |
| 6,538,470 B1 | 3/2003 | Langhammer et al. | |
| 6,542,844 B1 * | 4/2003 | Hanna | 702/120 |
| 2002/0010902 A1 | 1/2002 | Chen et al. | |
| 2002/0074481 A1 | 6/2002 | McGrath et al. | |
| 2002/0101258 A1 | 8/2002 | Ting | |
| 2002/0163357 A1 | 11/2002 | Ting | |
| 2002/0175704 A1 | 11/2002 | Young et al. | |
| 2003/0005402 A1 | 1/2003 | Bal | |

* cited by examiner

*Primary Examiner*—Matthew Heneghan
(74) *Attorney, Agent, or Firm*—Edell, Shapiro & Finnan, LLC

(57) ABSTRACT

A method of bypassing a programmable processing element can include examining data where the data has at least a header, removing the header from the data, encrypting the data through a cryptographic component, rejoining the removed header and the encrypted data, and outputting the rejoined header and encrypted data.

7 Claims, 3 Drawing Sheets

METHOD OF IMPLEMENTING A HIGH-SPEED HEADER BYPASS FUNCTION

FIELD OF THE INVENTION

This application relates to a bypass function, and more particularly, a high-speed header bypass function.

BACKGROUND

The advent of the Joint Tactical Radio System (JTRS) has created a software defined radio (SDR) based on the Software Communications Architecture (SCA). SDR radios that are being built for the Department of Defense (DoD) must be SCA compliant. If the radio needs to receive or send secure data, the requirements of the Security Supplement apply. The Security Supplement defines that the user side of a radio (where the user data is supplied) be defined as red. Once the data is encrypted, it is called black. When implementing a radio with embedded security, different types of data exist that need to move across the red-to-black or black-to-red sides of the radio. The user traffic data must be encrypted. However, not all of the data can be encrypted. Some of the data (which will usually exist in packet form) must bypass the encryption process, but must be reunited with the other data on the black side of the radio. The bypass process from red-to-black must be carefully monitored to prevent inadvertent disclosure of user data. Also, the traffic data packet may contain embedded real-time commands, which must also be bypassed.

Currently implemented bypass functions for encrypted/unencrypted data are slow, i.e., the data is not transferred at traffic rates. One current solution under consideration is to build in a bypass as part of the algorithm. However, such a solution requires a unique algorithm design and recertification of that algorithm. This solution is not really feasible, particularly in terms of expense and time.

There are two currently practiced methods for performing the bypass function. Generally, the first method intercepts the data stream, removes the header or real-time command from the data stream, and routes the header outside the en/decrypt module. Additional logic and/or circuitry validate the contents of the header. This method has been the traditional implementation for many years, and requires a significant amount of bypass circuitry.

The second method allows the header to enter the en/decrypt module. The en/decrypt algorithm checks the header contents and performs the en/decrypt function. This method requires unique implementation of the en/decrypt algorithm for each header scheme.

A processing element that can efficiently and cost effectively bypass a cryptographic component without the need for a unique algorithm for each implementation is desirable.

SUMMARY

An implementation of a programmable processing element such as a FPGA can validate headers at a high rate, i.e., at data transfer rates, does not require a unique algorithm for each implementation. More particularly, the encryption algorithm can be isolated, within the processing element, which is a property, for example, of a FPGA that permits a high-speed header bypass to be implemented. (The lack of dependency between the algorithm and the bypass function is necessary for NSA certification. It is not required, if certification is not desired.) The bypass function can examine the data being transferred, strip the header information to bypass the algorithm, encrypt the balance of the data through the algorithm, and then match the header and encrypted data back together. The examining, stripping, encrypting, and matching together can occur at traffic rates. Additionally, the bypass can check what data is being bypassed to make sure that the data contents are permissible to bypass. (This examination of the data is necessary for NSA certification. It is not required, if certification is not desired.)

In one general aspect, a method of bypassing a programmable processing element can include examining data, removing the header from the data, encrypting the data through a cryptographic component, rejoining the removed header and the encrypted data, and outputting the rejoined header and encrypted data. The data can include at least a header.

Some or all of the following features may be included in the above method of bypassing. The programmable processing element can be at least one FPGA. The data can also include an Internet protocol header. The data can further include an internal Internet protocol header. The data can be at least one of speech data, Ethernet data, or IC5232 data.

The header can be transferred around the cryptographic component. The cryptographic component can be an encrypting algorithm.

The examining data can occur at traffic rates. The removing the header can occur at traffic rates. The encrypting the data can occur at traffic rates. The rejoining the removed header and the encrypted data can occur at traffic rates.

The method of bypassing a programmable processing element of claim 1 can further include validating the data. The validating the data can include checking at least one of the header format, number of bits, contents, and details.

In another general aspect, a programmable processing element can include examination logic, separation logic, an encryption component, and merge logic. The examination logic can examine the input data. The input data can include at least a header. The separation logic can remove the header from the examined data. The header can be transferred outside the encryption component, wherein the encryption component includes a cryptographic element such that the data can be encrypted. The merge logic can rejoin the removed header and the encrypted data to be output.

Some or all of the following features can be included in the above implementation. The programmable processing element can be at least one FPGA.

The programmable processing element can further include validation logic. The validation logic can determine whether to encrypt the data. The validation logic can check at least one of the header format, number of bits, contents, and details.

The data can further include an Internet protocol header. The data can further include an internal Internet protocol header.

The examination logic can operate at traffic rates. The separation logic can operate at traffic rates. The merge logic can operate at traffic rates.

The data can be is at least one of speech data, Ethernet data, or IC5232 data.

The details of one or more implementations are set forth in the accompanying drawings and the description below. Other features and advantages will be apparent from the description and drawings, and from the claims.

DETAILED DESCRIPTION

Figure 1:
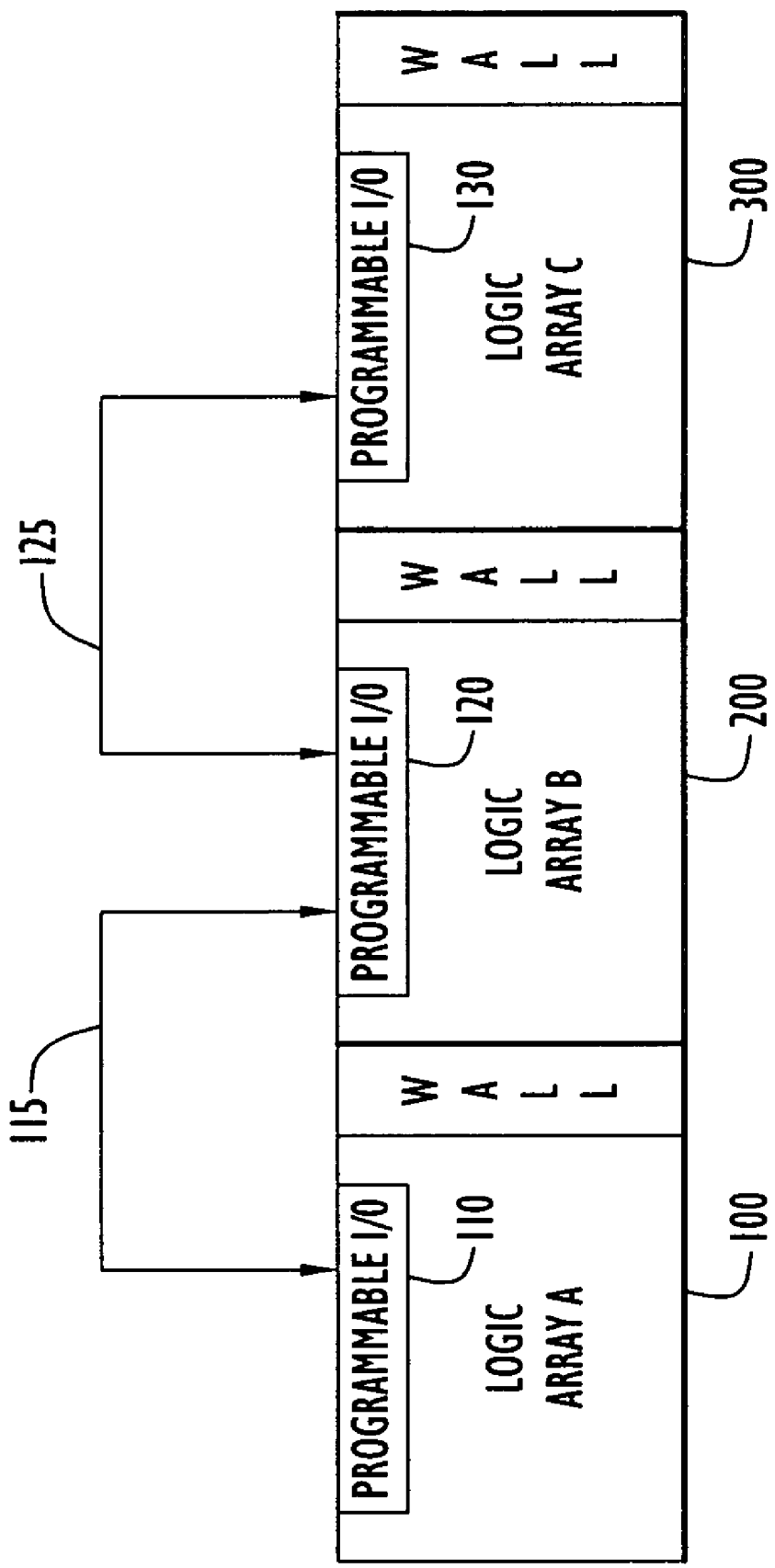
FIG. 1 illustrates a functional block diagram of an FPGA.

By isolating the cryptographic algorithm and using a programmable processing element such as a FPGA, a high speed header bypass can be implemented. The high speed header bypass can be implemented using one or more FPGAs. Referring to FIG. 1, the bypass processing can use processing elements that are physically isolated from each other or include properties that allow processing elements to function independently within a single processing entity.

In a specific implementation, an FPGA 100 can be used to implement the high speed header bypass. A property of a FPGA that permits functions to be isolated from each other provides this ability. Although this implementation discusses an FPGA approach, it is applicable to any processing element that can isolate tasks, such as a microprocessor or its derivatives. As shown in FIG. 1, the functions 110, 120, 130 can communicate 115, 125 only with each other outside of the FPGAs 100, 200, 300.

In use, generally, high speed header bypass processing can examine the data being transferred, strip the header information to bypass the cryptographic component, encrypt the balance of the data through the algorithm, and then match the header and encrypted data back up. The examining, stripping, encrypting, and matching together can occur at traffic rates. The critical direction that requires the most scrutiny is the direction from unencrypted data to the encrypted data. This direction is the most critical since the data to be bypassed may contain hidden information that was either accidentally inserted by malfunctioning user processes or malicious processing that was inserted into a user processing site. Additionally, the bypass can check what data is being bypassed to make sure that the data contents are permissible to be bypassed.

Data communications can be complicated. Encrypted and decrypted data may be sent via the same radio. Radios often have networks built in that include multiple processors. The network may be a communication including Internet protocol (IP) headers.

Data can include, for example, speech data, Ethernet data, and IC5232 data. This data is "red" data, i.e., not encrypted. The IP header associated with the red data provides the destination address for the data. There can also be an internal IP header that routes the data within the communications device and provides a destination address on the black side of the communications device for the data.

A cryptographic subsystem can process red data, i.e., unencrypted data, through an algorithm to encrypt the data. The data is then considered "black" data, i.e., encrypted data. The algorithm is a generally a mathematical manipulation. The internal IP header cannot be encrypted, however, because the data would not know its destination on the black side of the communications device without the internal IP header.

The bypass can examine the IP header passed with the data. Based upon what information is loaded, the validation logic can know whether to encrypt the data or not. The validation logic is a piece of logic that can separate and examine the header information. The validation state machine is a piece of logic that can check the header, i.e., format, number of bits, contents, and details of the header. Separation logic can strip or remove the internal IP header from the red data and the IP header. At the validation logic, the internal IP header can be checked by a state machine. When the header information has been validated, the internal IP header, for example, can be sent around the cryptographic component, i.e., encryption algorithm, through door A by the separation logic, which is run by the state machine. Virtually simultaneously, the encrypted data can be passed through state machine B and then the header can be rejoined with the encrypted data at the merge logic.

The black data can be output, i.e., transmitted, over the communications device, such as the Internet or RF, and the transmitted data can be considered protected because it is encrypted.

The header may be a command. Commands have no "payload," i.e., data to be encrypted. The state machine needs to understand what is being moved. So, state machine A can receive the command and validate the command. State machine A can notify state machine B that A's door is open and that there is a "good" command. State machine B can open door B. Door B opens because there is no need to wait for encrypted data to be matched with a header.

If Door A malfunctions, Door B stays closed. Thus, the two doors can operate independently and can communicate with each other to establish "trust" between the two doors with regard to operation. A security policy can control the flow of commands, i.e., how often commands come through. A security policy is a definition of what the state machine is supposed to examine, i.e., format, waveforms, etc.

Figure 2:
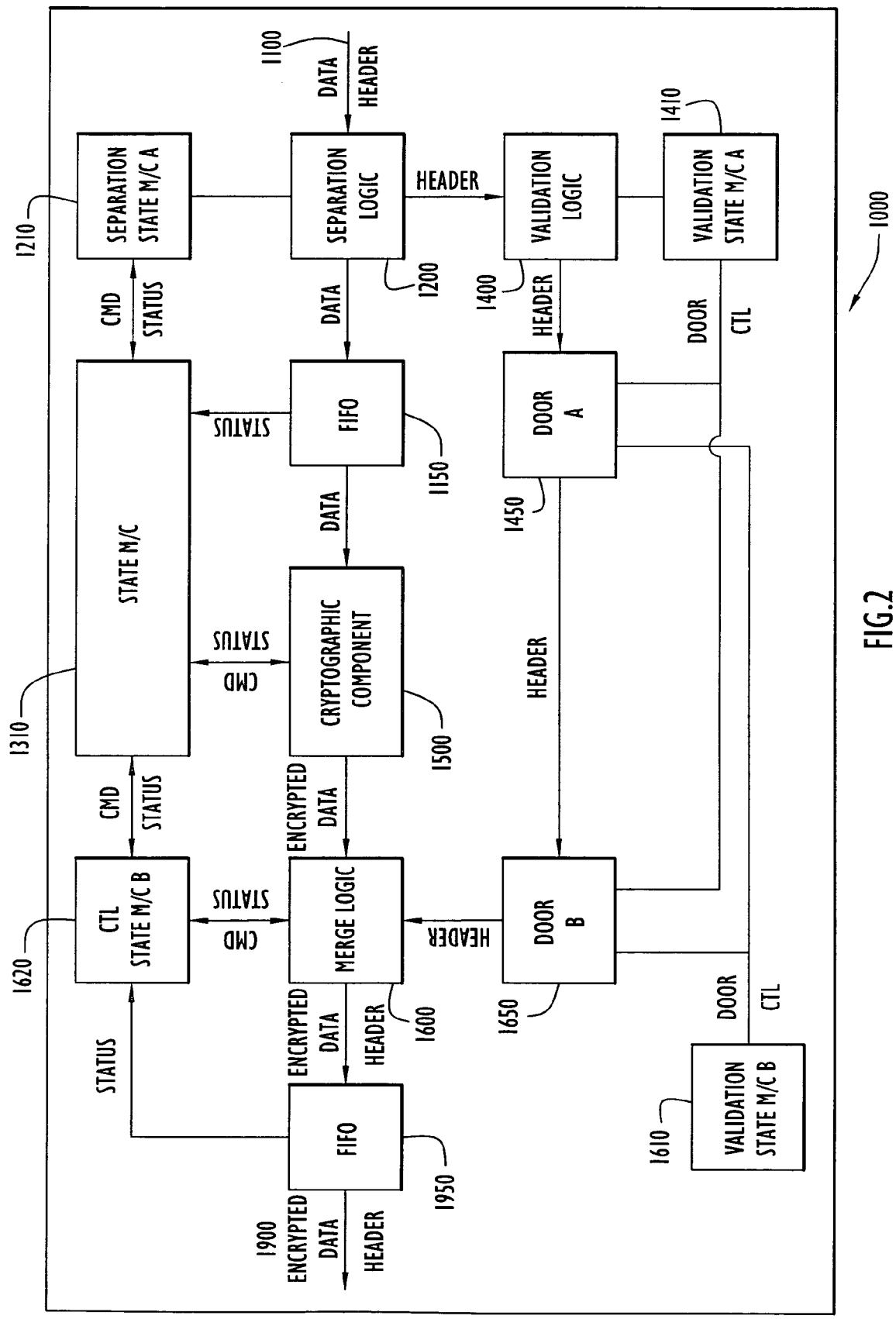
FIG. 2 illustrates an implementation of a FPGA including a high speed bypass.
Figure 3:
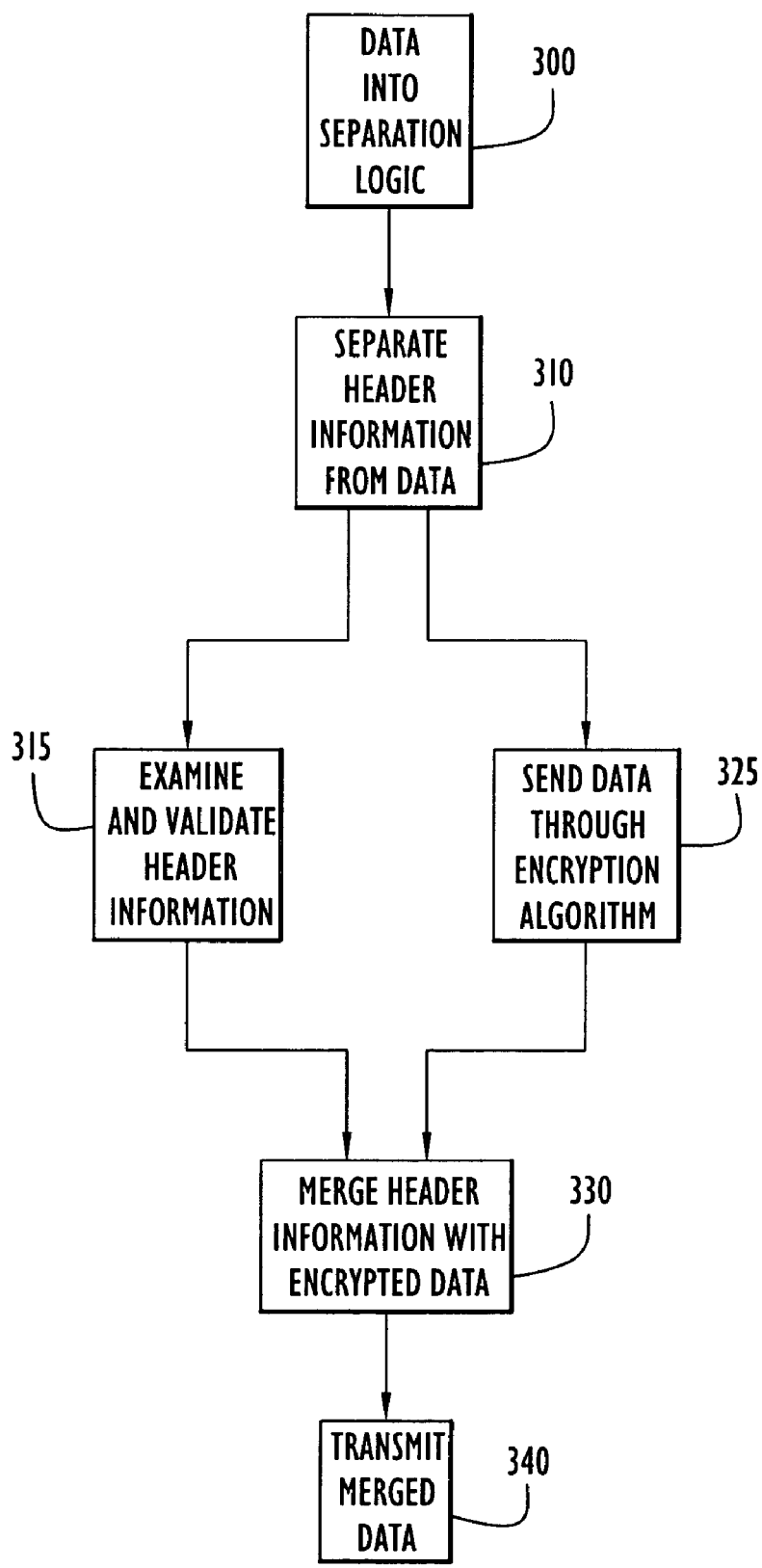
FIG. 3 is a flowchart describing a high speed header bypass in use.

Referring to FIGS. 2 and 3, the critical direction that requires the most scrutiny is the direction from unencrypted data to the encrypted data, as previously discussed. Data 1100 can enter the Separation Logic 1200, which can be controlled by the Separation State Machine (M/C) A 1210. (Step 300). A state machine 1310 is connected to the separation state machine A 1210 and controls the cryptographic component 1500 as described hereinafter.

Prior to processing data, a trusted control element can load the Control State M/C and the Control Logic (not shown) with the information to find, separate and validate the header that is being bypassed. (Step 310) This information can be derived from the Security Policy that is associated with the waveform. The waveform instantiation can request a particular algorithm be loaded to secure the channel traffic information. The aforementioned state machine can separate the data and the header. (Step 315)

The data can pass through a FIFO component 1150 to the cryptographic component 1500, and the header information can pass to the Validation Logic 1400, which can be controlled by the Validation State M/C A 1410. The validation logic 1400 supplies a valid header to door A logic 1450, which is coupled to door B logic 1650. Door A logic 1450 transfers the valid header to door B logic 1650 under control of the validation state machine logic A 1410 and validation state machine logic B 1610, respectively. For example, this logic can inspect the header information to determine whether its contents are valid. The Validation State M/C A 1410 can also, for example, validate the frequency of the header. (This information can also be contained in the Security Policy.) If the header information can be validated, Validation State M/C A 1410 can signal the Validation State M/C B 1610 that it has a valid header to transfer. (Step 315)

The Validation State M/C B 1610 can signal the Validation State M/C A 1410 that it is ready to accept the header. Both Validation State M/C A and B 1410, 1610 can open their respective doors, i.e., Door A and Door B, to allow the header to be received at the Merge Logic 1600. (Step 330) The Merge Logic can be controlled by CTL State M/C B 1620.

The cryptographic component, i.e., algorithm, 1500 can encrypt the data. (Step 325) The cryptographic component can remain unchanged for software transport or hardware mechanism.

The Merge Logic 1600 can merge the bypassed header and the encrypted data to form the merged data 1900. The Merge Logic 1600 can reassemble the data and header 1900 to maintain the order in which the data was input 1100. (Step 330) The merged data 1900 can pass through a FIFO component 1950 to be transmitted by the communication device. (Step 340)

Having described implementations of a high speed header bypass, it is believed that other modifications, variations and changes will be suggested to those skilled in the art in view of the teachings set forth herein. For example, such a bypass could be implemented solely as software, as hardware, or a combination thereof. It is therefore to be understood that all such variations, modifications and changes are believed to fall within the scope of the present invention. Although specific terms are employed herein, they are used in a generic and descriptive sense only and not for purposes of limitation.

I claim:

1. A method for high-speed header bypassing, the method comprising:
   receiving unencrypted data and a header associated with the unencrypted data;
   under control of separation state machine logic, separating the header from the associated unencrypted data;
   under control of first validation state machine logic, examining the header for format, number of bits and contents based on a security policy that defines what in the header is to be examined in order to determine whether the header represents a valid command;
   in response to said first validation state machine logic determining that the header represents a valid command, said first validation state machine logic controlling a first door logic to open;
   encrypting the unencrypted data with a cryptographic algorithm to produce encrypted data;
   signaling second validation state machine logic from the first validation state machine logic when the header is determined to represent a valid command, said signaling indicating a valid header is ready to transfer and that the first door logic is open;
   said second validation state machine logic opening second door logic in responsive to said signaling without waiting for the encrypted data to be matched with the header;
   in response to said second validation state machine logic receiving said signaling from the first validation state machine, enabling transfer of the valid header to merge logic;
   transferring the valid header on a connection between the first door logic when it is open and the second door logic when it is open, wherein the second door logic transfers the valid header to the merge logic thereby bypassing the cryptographic algorithm, wherein the first door logic and the second door logic operate independently of each other such that if the first door logic malfunctions, the second door logic stays closed; and
   merging the valid header and the encrypted data with the merge logic.

2. The method of claim 1, and further comprising the second validation state machine logic signaling the first validation state machine logic to indicate readiness to accept the valid header.

3. The method of claim 1, wherein receiving comprises receiving the unencrypted data comprising at least one of speech data and Ethernet data.

4. The method of claim 1, wherein one or more of said separating, examining, encrypting and merging is performed at a rate comparable to a data transfer rate of traffic carrying the unencrypted data.

5. A system for high-speed header bypassing comprising:
   separation logic that receives unencrypted data and a header associated with the unencrypted data and separates the header from the unencrypted data;
   a separation state machine that controls the separation logic;
   validation logic that examines the header for format, number of bits and contents based on a security policy that defines what in the header is to be examined in order to determine whether the header represents a valid command;
   a first door logic coupled to the validation logic that conveys the header to pass around an encryption process;
   first validation state machine logic that controls the validation logic, wherein said first validation state machine logic determines that the header represents a valid command in response controls the first door logic to open and thereby permit the header to bypass the encryption process;
   an encryption component that encrypts the unencrypted data with a cryptographic algorithm and produces encrypted data;
   second validation state machine logic that is responsive to signaling from the first validation state machine logic indicating that the header is valid and is ready for transfer around said encryption component;
   merge logic that merges the valid header and the encrypted data to be output; and
   a second door logic connected to the first door logic and to the merge logic;
   wherein said first validation state machine logic signals the second validation state machine logic when it determines that the header represents a valid command, said signaling indicating a valid header is ready to transfer and that the first door logic is open, and said second validation state machine logic opening the second door logic is responsive to said signaling without waiting for the encrypted data to be matched with the header; and
   wherein the valid header is transferred on a connection between the first door logic when it is open and the second door logic when it is open and the second door logic transfers the valid header to the merge logic thereby bypassing the encryption component, and wherein the first door logic and the second door logic operate independently of each other such that if the first door logic malfunctions, the second door logic stays closed.

6. The system of claim 5, wherein the second validation state machine logic signals the first validation state machine logic to indicate readiness to accept the valid header.

7. The system of claim 5, wherein one or more of the separation logic, validation logic, encryption component and merge logic operate at a rate comparable to a data transfer rate of traffic carrying the unencrypted data.

* * * * *